United States Patent [19]

Brownell

[11] 4,041,976

[45] Aug. 16, 1977

[54] SINGLE LEVER CONTROL ARRANGEMENT FOR ACTUATING MULTIPLE VALVES

[75] Inventor: Roy D. Brownell, Aurora, Ill.

[73] Assignee: Caterpillar Tractor Co., Peoria, Ill.

[21] Appl. No.: 636,510

[22] Filed: Dec. 1, 1975

[51] Int. Cl.² .......................... F16K 11/18; G05G 9/04

[52] U.S. Cl. .......................... 137/351; 74/471 XY; 137/636.2

[58] Field of Search .......................... 74/471 R, 471 XY; 137/636-636.4, 351; 200/6 A

[56] References Cited

U.S. PATENT DOCUMENTS

| | | | |
|---|---|---|---|
| 2,403,519 | 7/1946 | Gardiner | 137/636 X |
| 3,321,990 | 5/1967 | Densmore | 137/636.3 X |
| 3,805,674 | 4/1974 | Sebesta et al. | 137/636.1 X |
| 3,863,871 | 2/1975 | Meisenheimer | 248/15 |
| 3,893,346 | 7/1975 | Paul | 74/491 X |

*Primary Examiner*—Martin P. Schwadron
*Assistant Examiner*—Richard Gerard
*Attorney, Agent, or Firm*—Phillips, Moore, Weissenberger, Lempio & Majestic

[57] ABSTRACT

A single lever control arrangement for selectively actuating a pair of first and second valve spools reciprocally mounted in a housing comprises a handle assembly including a triangular plate pivotally mounted on the housing by a first ball and socket connection. The first and second valves are pivotally mounted to the plate by second and third ball and socket connections, respectively, whereby the valves may be reciprocated by the handle assembly separately or simultaneously.

10 Claims, 7 Drawing Figures

Fig 1
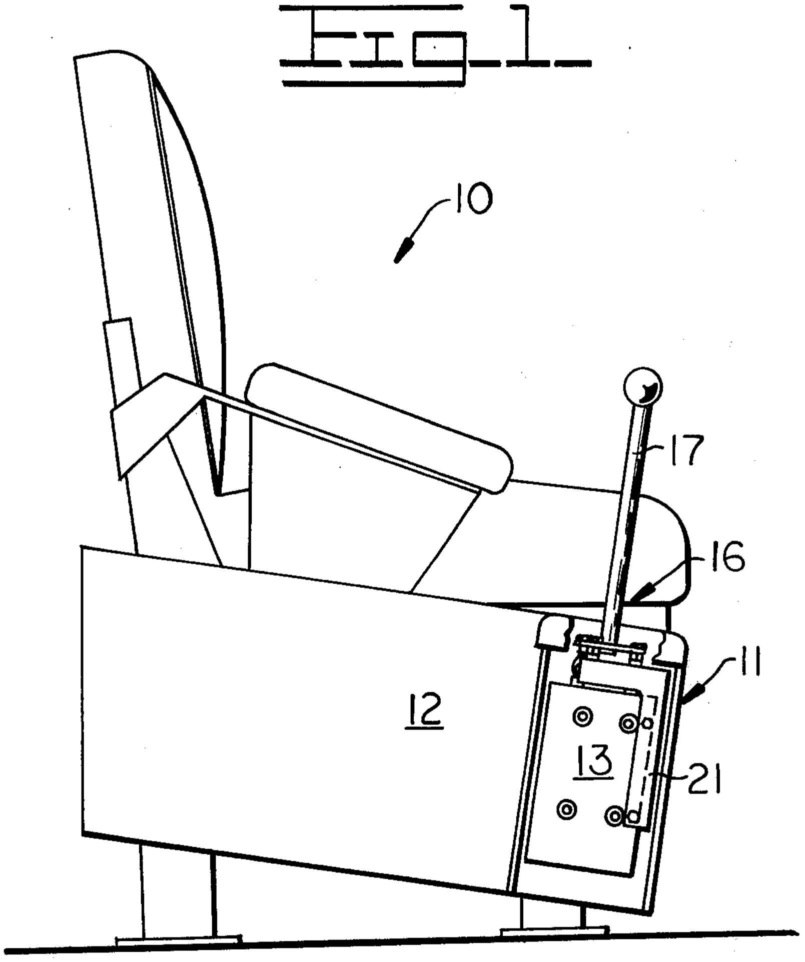
Fig 7
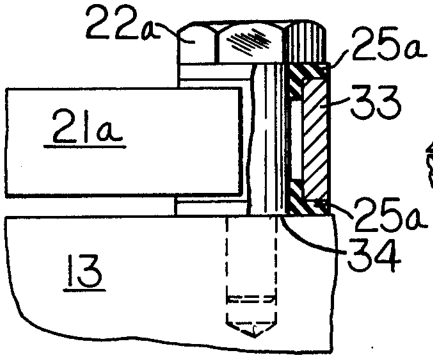
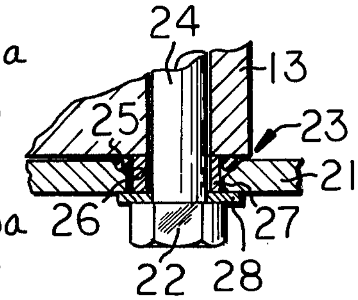
Fig 5
Fig 6
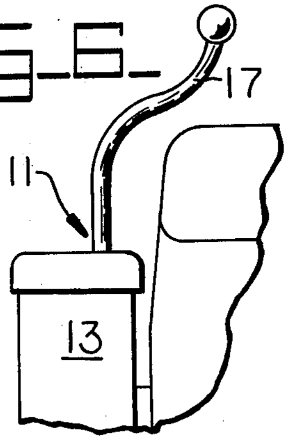

SINGLE LEVER CONTROL ARRANGEMENT FOR ACTUATING MULTIPLE VALVES

BACKGROUND OF THE INVENTION

This invention relates to a single lever control arrangement comprising a single handle or lever for selectively actuating a pair of valve spools integrated in a hydraulic circuit. Such a circuit is normally employed on a construction vehicle, such as a hydraulic excavator, for conditioning its hydraulic cylinders for various work tasks. Many conventional controls therefor are bulky, complex, expensive to manufacture and are not convenient to the operator to provide the precise control required for selective actuation of such cylinders. In addition, anti-rotation means are normally associated with the valve spools in such controls to prevent their rotation upon reciprocation thereof. The prevention of valve spool rotation is especially critical with respect to a valve spool having a slot formed axially thereon for communicating a pair of ports defined in a valve housing. In particular, rotation of the valve spool could place the slot in non-communicating relationship relative to the ports to thus render the system inoperative.

SUMMARY OF THE INVENTION

An object of this invention is to provide an improved control arrangement of the above type which is compact, non-complex, economical to manufacture and provides an operator with convenient means for precisely actuating a pair of valve spools either individually or simultaneously. The control arrangement further functions to substantially prevent rotation of the valve spools upon reciprocation thereof. Such arrangement comprises a pair of first and second valve spools reciprocally mounted in a housing and a handle assembly pivotally mounted on the housing by a first universal connecting means. The first and second valve spools are pivotally connected to the handle assembly by second and third universal connecting means, respectively, with all of the universal connecting means being disposed in spaced triangular relationship relative to each other. Thus, pivotal movement of the handle assembly about the first and second universal connecting means will reciprocate the second valve spool, pivotal movement of the handle assembly about the first and third universal connecting means will reciprocate the first valve spool and pivotal movement of the handle assembly only about the first universal connecting means will reciprocate the first and second valve spools simultaneously.

BRIEF DESCRIPTION OF THE DRAWINGS

Further objects of this invention will become apparent from the following description and accompanying drawings wherein:

FIG. 1 is a side elevational view of an operator's seat adapted to be mounted in the cab of a construction vehicle and having a single lever control arrangement of this invention mounted on a side thereof;

FIG. 5 is a sectional view of anti-backlash means employed in the single lever control arrangement, taken in the direction of arrows V—V in FIG. 2;

FIG. 6 is a partial front elevational view of the single lever control arrangement, taken in the direction of arrows VI—VI in FIG. 1; and FIG. 7 is a modification of the FIG. 5 anti-backlash means.

DETAILED DESCRIPTION

Figure 2:
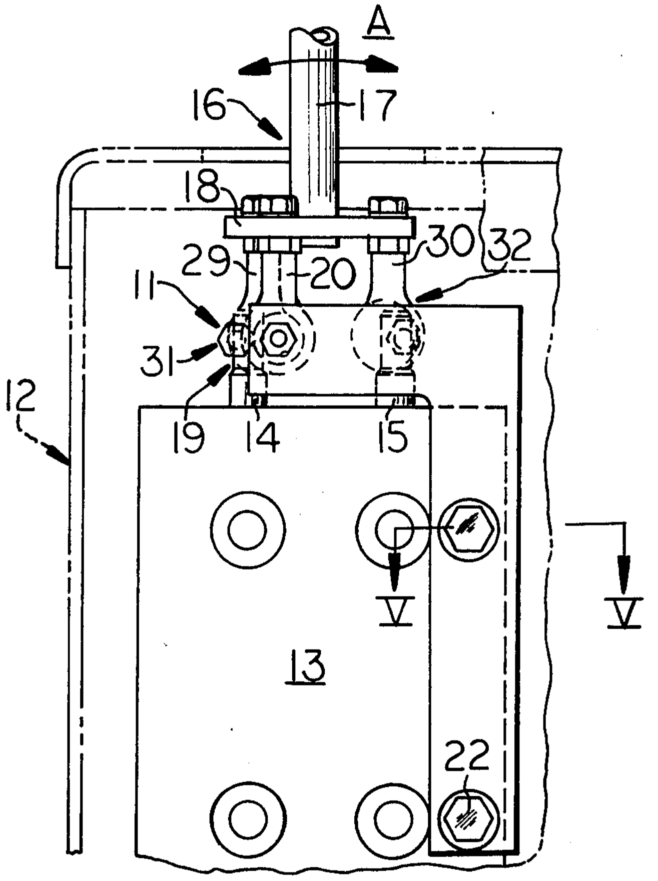
FIG. 2 is an enlarged side elevational view of the single lever control arrangement.
Figure 3:
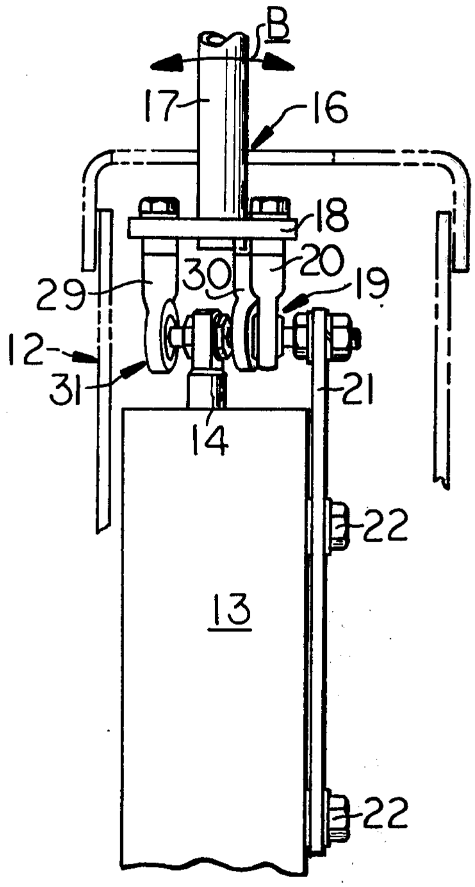
FIG. 3 is an end elevational view of the single lever control arrangement.

FIG. 1 illustrates an operator's seat 10 having a single lever control arrangement 11 of this invention mounted on a side frame 12 thereof. Referring to FIGS. 2 and 3, such arrangement comprises a stationary housing 13 having a pair of first and second valve spools 14 and 15, respectively, reciprocally mounted therein. The valve spools may each comprise a directional control valve, for example, suitably integrated into a hydraulic control circuit for selectively actuating double-acting cylinders (not shown) employed on a construction vehicle.

Figure 4:
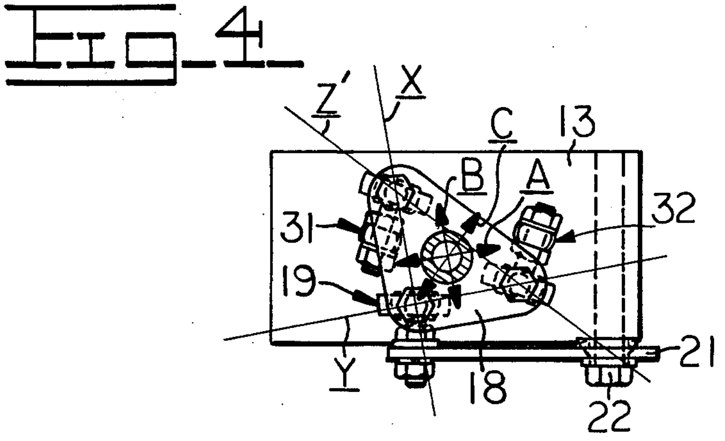
FIG. 4 is a top plan view of the single lever control arrangement, schematically illustrating various directions of operation thereof.

The single lever control arrangement further comprises a handle assembly 16 including an upstanding handle or lever 17 secured on a horizontally disposed triangular plate 18 (FIG. 4). First universal connecting means 19, pivotally mounting the handle assembly on housing 13, comprises a ball and socket connection pivotally mounting a vertically disposed link 20 of the handle assembly to an upper leg portion of an upstanding bracket 21, extending above the housing. The lower leg portion of the bracket is secured to a side of housing 13 by a pair of vertically disposed cap screws 22. Referring to FIG. 5, an anti-backlash means 23 mounts bracket 21 on a shank 24 of each cap screw 22 to permit limited universal movement of the bracket relative to housing 13 during operation of valves 14 and 15.

The anti-backlash means comprises an elastomeric O-ring member 25 seated in a frusto-conically shaped recess 26, formed on an inboard side of the bracket, to contact the bracket and housing. The O-ring is circumferentially disposed on a cylindrical spacer bushing 27, mounted on the shank of cap screw 22, and a washer 28 is disposed between a head of the cap screw and bracket 21. It can be seen in FIG. 5 that sufficient clearance is provided between the housing, bracket and bushing to permit limited universal movement of the bracket relative to the housing.

Referring again to FIGS. 2 and 3, first and second valves 14 and 15 are pivotally connected to links 29 and 30 of the handle assembly by second and third universal connecting means 31 and 32, respectively. Each of the downwardly extending and vertically disposed links 20, 29 and 30 of the handle assembly may be secured to a respective corner of plate 18 by a cap screw. Universal connecting means 31 and 32 each preferably constitutes a standard ball and socket connection of the type illustrated.

The operation of the single lever control arrangement will now be described with particular reference to FIG. 4. As shown, universal connecting means 19, 31 and 32 are disposed in spaced triangular relationship adjacent to respective corners of triangular plate 18 whereby pivotal movement of handle 17 in the direction of arc A and about a pivot axis X intersecting universal connecting means 19 and 31 will reciprocate second valve spool 15 only. Pivotal movement of the handle in the direction of arc B and about a pivot axis Y intersecting universal connecting means 19 and 32 and preferably perpendicular to axis X will function to reciprocate first valve spool 14 only.

Furthermore, pivotal movement of the handle in the direction of arc C, perpendicular to a pivot axis Z intersecting universal connecting means 19 and disposed parallel with respect to an axis Z' intersecting universal connecting means 31 and 32, will function to reciprocate valve spools 14 and 15 simultaneously. Infinite degrees of relative reciprocal movements of the valve spools can be effected by pivoting handle 17 in arcuate directions between the above-described arcuate directions C and B and C and A.

In addition to providing precise and infinite control of the valve spools, the above-described single lever control arrangement will alleviate the need for anti-rotational means associated with the valve spools. In particular, the lever control arrangement may be constructed to limit the rotation of the respective valve spools and lever during actuation thereof to $\pm 5°$. The arrangement also eliminates the need for anti-rotational means associated with the lever which is important when a bent lever (FIG. 6) is employed therein for convenience and comfort of the operator.

Also, when a trigger-type control (not shown) is mounted on the lever to control another machine function it is important to prevent rotation of the lever. Furthermore, anti-backlash means 23 associated with self-centering support bracket 21 will further function to dampen vibrations imposed on housing 13 and substantially prevent the same from being transmitted to the support bracket and to the valve spools.

FIG. 7 illustrates a modification of the FIG. 5 anti-backlash means and mounting for the handle assembly. In particular, a horizontally disposed single bracket or arm 21a (which thus eliminates the lower, vertically disposed leg of bracket 21) has one end secured to a metallic tube 33. The second end of the arm is pivotally connected to link 20 in the above-described manner. A pair of annular elastomeric bushings 25a are mounted on the opposite ends of tube 33 to permit limited universal movement of arm 21a relative to housing 13. The elastomeric bushings are compressed a predetermined amount by a shoulder bolt 22a which extends through the bushings and tube 33 into threaded engagement with housing 13 and has an annular shoulder 34 which abuts the upper surface of housing 13.

I claim:

1. A control arrangement comprising a housing, a pair of first and second valve spools reciprocally mounted in said housing, a handle assembly comprising a horizontally disposed plate having an upstanding handle secured thereon, first universal connecting means pivotally mounting said handle assembly on said housing, second universal connecting means pivotally connecting the plate of said handle assembly to said first valve spool, and third universal connecting means pivotally connecting the plate of said handle assembly to said second valve spool, said first, second and third universal connecting means disposed in spaced triangular relationship relative to each other whereby pivotal movement of said handle assembly about said first and second universal connecting means will reciprocate said second valve spool only, pivotal movement of said handle assembly about said first and third universal connecting means will reciprocate said first valve spool only, and pivotal movement of said handle assembly only about said first universal connecting means will reciprocate said first and second valve spools simultaneously, said handle disposed centrally on said plate and at least substantially within and between imaginary lines defining the triangular disposition of said first, second and third universal connecting means, said first, second and third universal connecting means cooperating for substantially preventing rotation of said first and second valve spools and said handle assembly about their respective axes.

2. The control arrangement of claim 1 wherein said housing is secured to a side of an operator's seat.

3. The control arrangement of claim 1 wherein said plate is triangular and has a link secured to each corner thereof to extend downwardly therefrom and connected to a respective one of said first, second and third universal connecting means.

4. The control arrangement of claim 1 wherein each of said first, second and third universal connecting means comprises a ball and socket connection.

5. The control arrangement of claim 1 wherein a pivot axis intersecting said first universal connecting means and said second universal connecting means is at least substantially perpendicular relative to a pivot axis intersecting said first universal connecting means and said third universal connecting means.

6. The control arrangement of claim 1 further comprising a bracket attached to said housing, said first universal connecting means pivotally mounting said handle assembly on said bracket.

7. The control arrangement of claim 6 further comprising anti-backlash means mounting said bracket on said housing for permitting limited universal movement of said bracket relative to said housing.

8. The control arrangement of claim 7 wherein said bracket comprises an upper leg portion pivotally mounted to said handle assembly by said first universal connecting means and a lower leg portion attached to a side of said housing by said anti-backlash means.

9. The control arrangement of claim 7 wherein said bracket constitutes a single arm having a first end thereof secured to a tube and a second end thereof pivotally mounted to said handle assembly, said anti-backlash means comprising a pair of annular elastomeric bushings mounted on opposite ends of said tube and a bolt extending through said bushings and said tube and threadably mounted on said housing.

10. A control arrangement comprising a housing, a pair of first and second valve spools reciprocally mounted in said housing, a handle assembly comprising a horizontally disposed plate having an upstanding handle secured thereon, first universal connecting means pivotally mounting said handle assembly on said housing, second universal connecting means pivotally connecting the plate of said handle assembly to said first valve spool, and third universal connecting means pivotally connecting the plate of said handle assembly to said second valve spool, said first, second and third universal connecting means disposed in spaced triangular relationship relative to each other whereby pivotal movement of said handle assembly about said first and second universal connecting means will reciprocate said second valve spool only, pivotal movement of said handle assembly about said first and third universal connecting means will reciprocate said first valve spool only, and pivotal movement of said handle assembly only about said first universal connecting means will reciprocate said first and second valve spools simultaneously, said handle disposed centrally on said plate and at least substantially within and between imaginary lines defining the triangular disposition of said first, second and third universal connecting means, a bracket attached to said housing, said first universal connecting means pivotally mounting said handle assembly on said bracket, and anti-backlash means mounting said bracket on said housing for permitting limited universal movement of said bracket relative to said housing.

* * * * *